United States Patent [19]

Kawaguchi

[11] 4,374,658
[45] Feb. 22, 1983

[54] DEVICE FOR PRODUCING A BLOCK OF SOLIDIFIED CARBON DIOXIDE

[76] Inventor: Yoshihisa Kawaguchi, 229-1-7, Akasaka 9-Chome, Minatoku, Tokyo, Japan

[21] Appl. No.: 323,085

[22] Filed: Nov. 19, 1981

Related U.S. Application Data

[63] Continuation of Ser. No. 173,353, Jul. 29, 1980, abandoned.

[30] Foreign Application Priority Data

Jul. 31, 1979 [JP] Japan .......................... 54/104886[U]

[51] Int. Cl.³ .............................................. B29C 3/00
[52] U.S. Cl. ......................................... 62/35; 62/10; 249/163; 249/167; 249/172
[58] Field of Search .................... 62/35, 10; 249/160, 249/163, 167, 170, 171, 172

[56] References Cited

U.S. PATENT DOCUMENTS

| | | | |
|---|---|---|---|
| 1,620,993 | 3/1927 | Burns et al. | 62/35 |
| 1,768,059 | 6/1930 | Hassensall | 62/35 |
| 2,016,815 | 10/1935 | Gilmore | 62/35 |
| 2,190,801 | 2/1940 | Otto | 249/171 |
| 3,298,656 | 1/1967 | Zastrow | 249/172 |
| 3,922,878 | 12/1975 | Jalali | 62/35 |

Primary Examiner—Norman Yudkoff

Attorney, Agent, or Firm—Cushman, Darby & Cushman

[57] ABSTRACT

A device for producing a block of solidified carbon dioxide essentially comprising a high pressure vessel of liquidified carbon dioxide, a thermally insulated high pressure feed tube and a molding box in which a product of solidified carbon dioxide is molded in the form of block, wherein the molding box contains a single molding chamber in a cubic structure which consists of a top cover, a pair of first side walls, a pair of second side walls and a base board, each of which members is designed so as to be easily assembled or disassembled, said first and/or second side walls being formed with a plurality of openings through which gaseous medium flows and being provided with a layer of filter fixedly secured to the inner wall thereof respectively. The base board and the second side walls are formed with engagement grooves for allowing the first and second side walls and base board to be easily assembled or disassembled. Further locking means are provided for ensuring tight locking of the molding box. In an alternative embodiment the molding box may contain a plurality of molding chambers of which number correspond to that of blocks of solidified carbon dioxide to be produced. Liquidified carbon dioxide is delivered to a common distributor via the high pressure feed tube and then distributed to each molding chamber through a lever operated pressure reducing valve and nozzle means.

20 Claims, 5 Drawing Figures

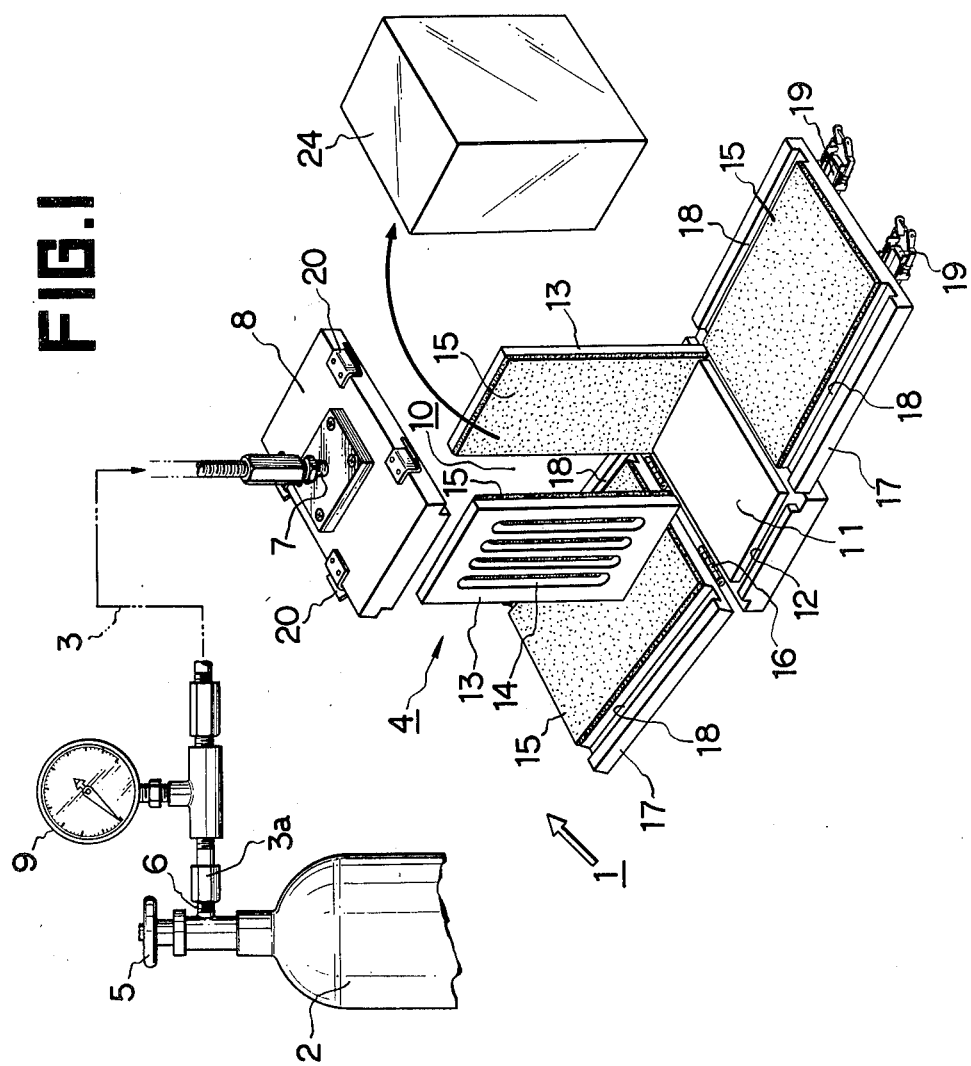

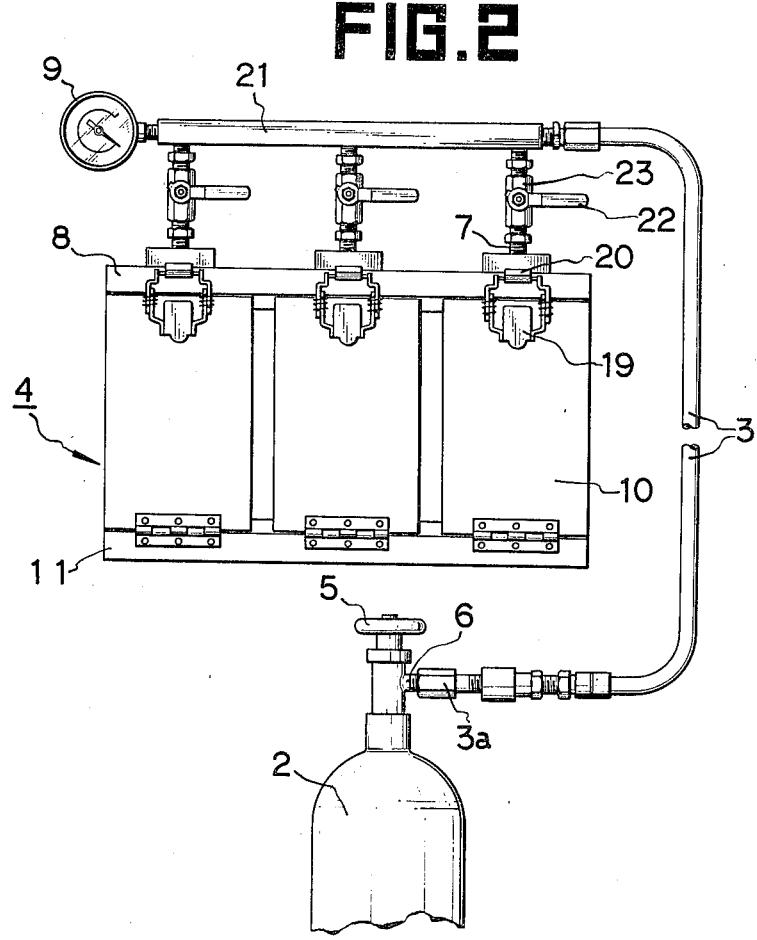

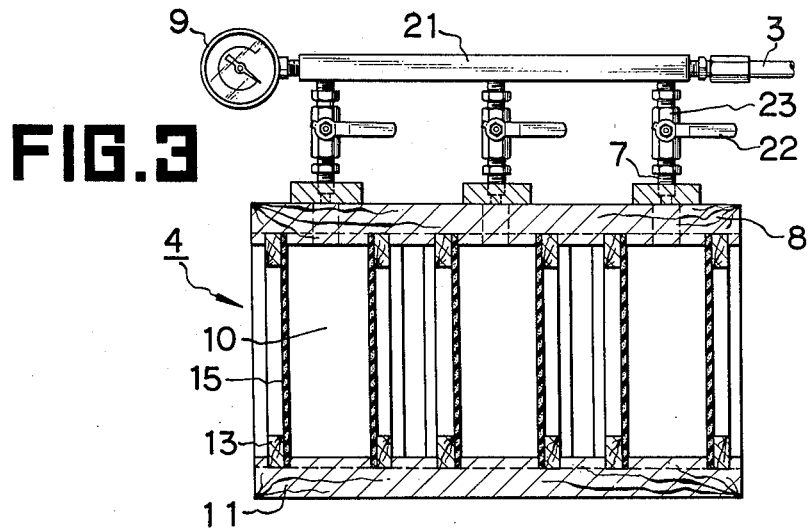
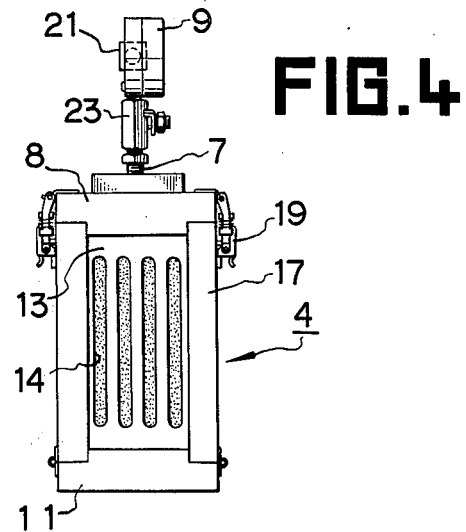

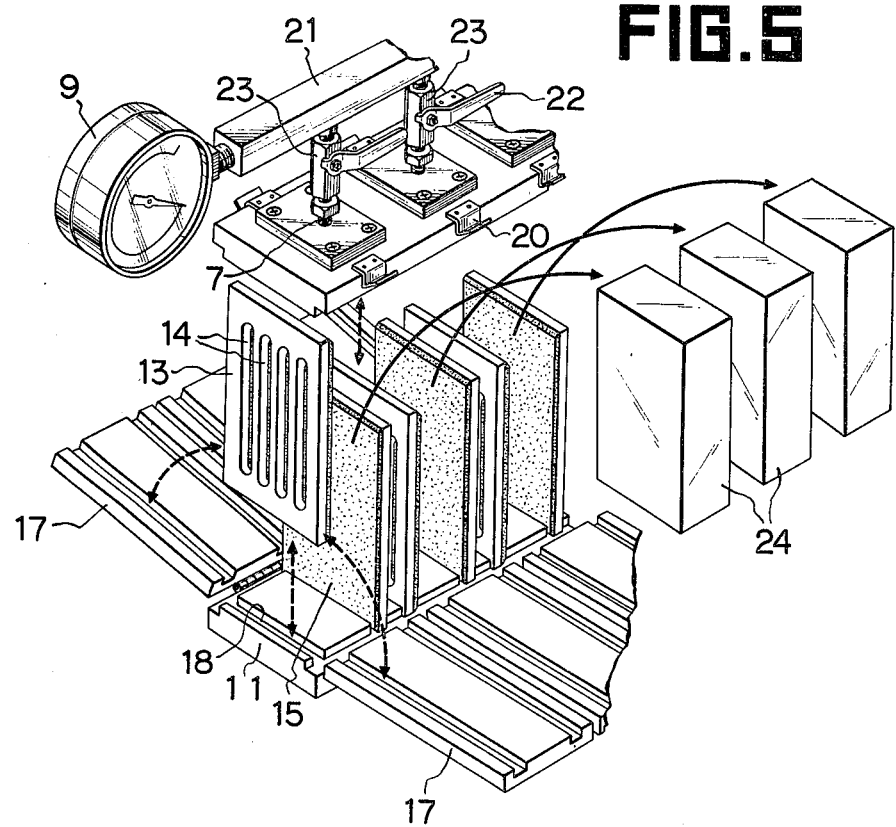

DEVICE FOR PRODUCING A BLOCK OF SOLIDIFIED CARBON DIOXIDE

This is a continuation of application Ser. No. 173,353 filed July 29, 1980, abandoned.

BACKGROUND OF THE INVENTION

1. FIELD OF THE INVENTION

The present invention relates to a device for producing a block of carbon dioxide and more particularly relates to a portable device for molding a product of solidified carbon dioxide in a molding box which is constructed in a small size and light weight and is easily assembled or disassembled at any place.

2. DESCRIPTION OF THE PRIOR ART

Hitherto apparatus for manufacturing products of solidified carbon dioxide (commercially called as dry ice) are generally classified into two types, that is, large size of apparatus or installation particularly mounted in a specialized factory or plant and relatively small size of equipment or apparatus. It is pointed out as drawbacks with the aforesaid conventional equipment and apparatus, however, that the large sized one has a substantial difficulty of thermal insulation during transportation of products of solidified carbon dioxide from production side such as refrigerating factory or plant to remote locations where they are consumed and moreover requires well experienced operators for operating the same, while the small sized one is very complicated in structure, uneconomical in operation and expensive to be manufactured due to the fact that it is constructed of metallic material which leads to high thermal loss mainly because of thermal conduction.

SUMMARY OF THE INVENTION

The present invention is intended to eliminate the above mentioned drawbacks with the conventional equipment or apparatus and construct this kind of apparatus in a remarkably small size and simple structure in accordance with the conventional theory of producing a block of solidified carbon dioxide. A device for producing a block of solidified carbon dioxide in accordance with the present invention essentially comprises a high pressure vessel in which liquidified carbon dioxide is contained, a thermally insulated high pressure feed tube and a molding box in which the required product of solidified carbon dioxide is molded in the form of block, one end of said high pressure feed tube being connected to said high pressure vessel via valve means comprising a stop valve and pressure reducing valve, while the other end thereof being connected to said molding box via a nozzle means, and is operated in such a manner that when opening the stop valve, liquidified carbon dioxide is delivered to the molding box via the high pressure feed tube and nozzle means, in which liquidified carbon dioxide is ejected into the molding chamber in the form of snow falling due to adiabatic expansion, while flowing out through the layer of filter securely arranged over the inner walls of the molding chamber, resulting in snow-shaped solidified carbon dioxide accumulated in the molding chamber. Supply of liquidified carbon dioxide continues until the molding box is filled with solidified carbon dioxide having a predetermined specific density. After completion of supplying liquidified carbon dioxide the molding chamber is disassembled to take a block of solidified carbon dioxide therefrom. Preferably the high pressure feed tube for delivering liquidified carbon dioxide to the molding chamber is made of flexible material which has excellent resistibility against low temperature and high pressure. Special synthetic rubber reinforced with steel wires is preferably employed for this purpose. Further the molding box is preferably made of material having low thermal conductivity and high resistibility against low temperature such as wood and the similar material.

In an alternative embodiment of the invention the device for producing a block of solidified carbon dioxide is constructed in the type of multi-chamber. Specifically the molding box comprises a plurality of molding chambers of which number corresponds to that of blocks to be molded therein. The respective molding chambers are arranged side by side with partitions located therebetween. In this modified embodiment of the invention liquidified carbon dioxide is delivered to a common distributor located above the top cover of the molding box via the pressure feed tube and then is ejected into the respective molding chambers through lever operated pressure reducing valves and nozzles.

Thus it is an object of the present invention to provide a portable type device for producing a block of solidified carbon dioxide which is designed in a very small size and light weight.

It is other object of the present invention to provide a device for producing a block of solidified carbon dioxide which is easily operated merely by way of opening the valve means and disassembling the molding box.

It is another object of the present invention to provide a device for producing a block of solidified carbon dioxide which is inexpensive to be manufactured.

Other objects and advantageous features of the present invention will be obvious from the following description with reference to the accompanying drawings which forms a part of the invention.

BRIEF DESCRIPTION OF THE ACCOMPANYING DRAWINGS

Now the present invention will be described in more details with reference to the accompanying drawings which illustrated preferred embodiments of the invention, in which FIG. 1 is a perspective view of a device for producing a block of solidified carbon dioxide in accordance with an embodiment of the invention, wherein the device is shown in a disassembled state for the purpose of being readily understood.

FIG. 2 is a front view of the device in accordance with a modified embodiment of the invention.

FIG. 3 is a vertical sectional view of the device in FIG. 2.

FIG. 4 is a side view of the device in FIG. 2, and

FIG. 5 is a partial perspective view of the device in FIG. 2, wherein the essential part of the device is shown in a disassembled state.

DETAILED DESCRIPTION OF THE PREFERRED EMBODIMENTS OF THE INVENTION

As illustrated in FIG. 1 in which the device of the invention is generally designated by the reference numeral 1, it essentially comprises a high pressure vessel 2 in which liquified carbon dioxide is contained, a thermally insulated high pressure feed tube 3 and a molding box 4 containing a single molding chamber in which a required block of solidified carbon dioxide is molded.

Specifically said high pressure vessel 2 is provided with a valve 5 of which connector portion 6 is connected to one end of said thermally insulated pressure feed tube 3 via a ball type pressure reducing valve 3a. In the meanwhile, the other end of the feed tube 3 is connected to a cover 8 of the molding box 4 via a nozzle means 7.

In the vicinity of the one end of the feed tube 3 is fixedly located a pressure gauge 9.

It is to be noted that the feed tube 3 which forms an essential part of the device of the invention is made of flexible material such as special synthetic rubber which has excellent properties against high pressure and low temperature, while being reinforced by means of wires of metallic material such as steel.

The molding box 4 in which a single molding chamber 10 is provided comprises a base board 11, a pair of first side walls 13, a pair of second side walls 17 and a cover 8. The base board 11 is formed with engagement grooves 12 extending in parallel to the side edges thereof in a spaced relation therefrom, into which the respective first side walls 13 are fit at the lower end thereof so as to stand upright. Further the first side walls 13 oppositely located on the base board 11 in a face to face relation are formed with a plurality of elongated openings 14 and moreover a layer of filter 15 fixedly secured to the inner wall thereof, said filter 15 having a predetermined mesh size to ensure the required permeability. The second side walls 17 also oppositely located on the base board 11 in a face to face relation are provided with hinges 16 (partly seen in FIG. 1) at the lower ends thereof, which serve for pivotally connecting the former to the latter, and moreover are adapted to come in engagement with the first side walls 13 by means of two engagement grooves 18 on the inner wall of the second side wall 17, into which the side edge portion of the standing first side wall 13 is fit. It is to be noted that the second side walls 17 are also formed with plural elongated openings 14 and have a layer of filter 15 on the inner wall thereof. Further the second side walls 17 are provided with a snap type locking means 19 at the upper end thereof, while the cover 8 is provided with engagement pieces 20 on the upper surface, whereby the second side walls 17 and cover 8 are connected one another in a locked state.

Thus the molding box 4 is constructed by way of the steps of fitting the first side walls 13 into the engagement grooves 12 on the base board 11, turning up the second side walls 17 until the side edges of the first side walls 13 fit into the engagement grooves 18 on the inner wall of the second side walls 17, placing the cover 8 over the respective upper edges of the both first and second side walls 13 and 17, and then allowing the locking means 19 to hang on the engagement piece 20 for ensuring tight locking.

The aforesaid cover 8, first side walls 13, second side walls 17 and base board 11 are made of any suitable material having excellent properties in thermal insulation and high resistivity against lower temperature such as wood, plastics or similar material. In the meanwhile, the filter 15 is made of any material having high resistivity against lower temperature and excellent permeability and in the illustrated embodiment plastic filters are employed.

Now operation of the device for producing a block of solidified carbon dioxide will be described below.

First, the high pressure vessel 2 having liquidified carbon dioxide contained therein is released by opening the valve 5 and thereby liquidified carbon dioxide is ejected into the molding chamber 10 through the nozzle 7 via the high pressure feed tube 3. During ejection into the molding chamber 10 liquidified carbon dioxide is pressure reduced to adiabatic expansion, resulting in a mixture of snow-shaped solidified carbon dioxide and gaseous carbon dioxide produced in the moulding chamber 10.

The gaseous component in the aforesaid mixture in the molding chamber 10 flows out through the layer of the filter 15 and the elongated openings 14, whereas the solid component having a certain specific density is gradually accumulated against the layer of the filter 15 under pressure of the flowing gaseous component in the molding chamber 10 until a required block 24 of solidified carbon dioxide is molded therein. It is preferable to close the valve 5, when a predetermined period of time elapses since starting of operation.

In order to take the product 24 of solidified carbon dioxide produced in the above described manner from the molding chamber 10 the locking means 19 on the second side walls 17 are disconnected from the corresponding engagement pieces 20 on the cover 8. Then the cover 8 is taken aside. Now the second side walls 17 are ready to turn out about the hinges 16. Then the first side walls 13 are removed from the grooves 12 of the base board 11 in the upward direction. Since the whole enclosure comprising the cover 8 and first and second side walls 13 and 17 are removed, the product 24 on the base board 11 can be taken out. As a result of repeated experiments with the use of the device in accordance with the invention it has been found that the products 24 typically has a specific density of 0.85 g/cc and is produced at a yielding rate in the range of 30 to 40%, wherein a theoritical yielding rate amounts to 47% in case of a the system for producing solidified carbon dioxide in accordance with the invention. The aforesaid specific density of the product means that the same has a mechanical strength sufficient to stand practical use.

Next, another device for producing a block of solidified carbon dioxide in accordance with a modified embodiment of the invention will be described with reference to FIGS. 2 through 5. This modified embodiment of the invention lies in that there are provided three molding chambers 10 for a single device. It is to be noted that parts or components similar to those in FIG. 1 are given the same reference numeral.

When opening the valve 5 in the high pressure vessel 2, liquidified carbon dioxide is delivered to a common distributor 21 via the thermally insulated high pressure feed tube 3, said distributor 21 being preferably made of aluminum alloy or the like. The distributor 21 is provided with three pressure reducing valves 23 which are adapted to be separately operated by means of any of levers 22. As the first lever 22 is operated to open the first pressure reducing valve 23, liquidified carbon dioxide is ejected into the first chamber 10 in the form of snow falling in the same manner as described above. Snow-shaped solidified carbon dioxide is increasingly accumulated in the chamber 10 until the same is fully filled to a block of product 24 which is compressed and molded to the predetermined specific density. When it is found that the required product 24 is molded therein, the first lever 22 is operated in the opposite direction to close the first pressure reducing valve 23. It is obvious that molding operation in the second or third molding chamber 10 is performed by way of the same steps as those in the first molding chamber 10 as described above. Thus it is possible to produce plural blocks of products 24 at the same time or one after another in accordance with the modified embodiment of the invention.

It will be readily understood that the above decribed embodiments are merely illustrative of the invention and various modifications or change could be made without any departure from the scope and spirit of the invention.

What is claimed is:

1. A device for producing a block of solidified carbon dioxide essentially comprising, in combination:
   a high pressure vessel in which liquified carbon dioxide is contained,
   a thermally insulated high pressure feed tube, and
   a molding box comprising a single molding chamber in which the required product of solidified carbon dioxide is molded in the form of block,
   one end of said high pressure feed tube being connected to said high pressure vessel via valve means comprising a stop valve and pressure reducing valve while the other end thereof being connected to said molding box via a nozzel means,
   wherein said molding box is constructed in a cubic structure of square or rectangular configuration and essentially comprises a top cover having said nozzle means secured thereto, a pair of first side walls oppositely located in a fact-to-face relationship and a base board, each of said members being formed to define a square or rectangle and adapted to be connected to or disconnected from any one of the adjacent members,
   said first and/or second side walls being formed with a plurality of openings through which gaseous carbon dioxide flows out and further being provided with a layer of filter material having a predetermined mesh size which filter material is fixedly secured to the inner wall thereof, respectively.

2. A device as set forth in claim 1, wherein the first side walls are adapted to be fit into engagement grooves on the base board at their lower end portions so that they stand upright, while the second side walls are adapted to turn about hinge means which are fixedly secured to the side edges of the base board so that they are connected to the first side walls by way of allowing the vertically extending side edges of the first side walls to be fit into the engagement grooves on the inner wall of the second side walls.

3. A device as set forth in claim 1 or 2, wherein the second side walls are provided with locking means at the upper end portion thereof respectively, which are adapted to come in engagement with engagement pieces fixedly secured to the side edges of the top cover, whereby the second side walls together with the first side walls are fixedly connected to the top cover.

4. A device as set forth in claim 1, wherein the plural openings on the first and/or second side walls through which gaseous medium flows out include a plurality of vertically extending elongated openings arranged in parallel to each other in a spaced relation.

5. A device as set forth in claim 3, wherein the locking means on the upper end portion of the second side wall is a snap type locking means.

6. A device as set forth in claim 1, wherein a pressure gauge is arranged between the one end of the high pressure feed tube and the pressure reducing valve on the high pressure vessel.

7. A device as set forth in claim 1, wherein the pressure feed tube is made of flexible material having high resistability against low temperature and high pressure.

8. A device as set forth in claim 1, wherein the molding box is made of material having low thermal conductivity and high resistability against pressure.

9. A device for producing a block of solidified carbon dioxide essentially comprising, in combination:
   a high pressure vessel in which liquified carbon dioxide is contained,
   a thermally insulated high pressure feed tube,
   a common distributor, and
   a molding box comprising a plurality of molding chambers in which the required number of products of solidified carbon dioxide are molded in the form of block,
   one end of said high pressure feed tube being connected to said high pressure vessel via valve means comprising a stop valve and pressure reducing valve while the other end thereof being connected to said molding box via said distributor,
   lever operated pressure reducing valves and nozzle means,
   wherein the molding box is constructed in a cubic structure of rectangular configuration and essentially comprises a top cover having the plural nozzel means secured thereto, plural pairs of first side walls oppositely located in a fact-to-face relation and a base board, each of said members being formed to define a square or rectangle and adapted to be connected to or disconnected from any one of the adjacent members,
   said first and/or second side walls being formed with a plurality of openings through which gaseous carbon dioxide flows out and further being provided with a layer of filter material having a predetermined mesh size which filter material is fixedly secured to the inner wall thereof respectively.

10. A device as set forth in claim 9, wherein the plural blocks of solidified carbon dioxide are produced in the respective molding chambers at the same time or one after another by opening the lever operated pressure reducing valves at the same time or successively.

11. A device as set forth in claim 9 or 10, wherein the number of pairs of first side walls corresponds to the required number of blocks or solidified carbon dioxide to be molded, the respective pairs of first side walls being arranged side by side.

12. A device as set forth in claim 11, wherein the respective second side wall is formed with engagement grooves on the inner wall thereof, of which number corresponds to that of the first side walls.

13. A device as set forth in claim 9, wherein the respective first side walls are adapted to be fit into engagement grooves on the base board at their lower end portion so that they stand upright, while the second side walls are adapted to turn about hinge means on the side edges of the base board so that they are connected to the first side walls by way of allowing the vertically extending side edges of the first side walls to be fit into the engagement grooves on the inner wall of the second side walls.

14. A device as set forth in claim 9, 10 or 13, wherein the second side walls are provided with locking means at the upper end portion thereof resspectively, which are adapted to come in engagement with engagement pieces on the side edges of the top cover, whereby the second side walls together with the first side walls are fixedly connected to the top cover.

15. A device as set forth in claim 14, wherein the locking means on the upper end portion of the second side wall is a snap type locking means.

16. A device as set forth in claim 9, wherein the plural openings on the first and/or second side walls through which gaseous medium flows out include are a plurality of vertically extending elongated openings arranged in parallel to each other in a spaced relation.

17. A device as set forth in claim 9, wherein a pressure gauge is arranged at one end of the distributor.

18. A device as set forth in claim 9, wherein the pressure feed tube is made of flexible material having high resistibility against low temperature and high pressure.

19. A device as set forth in claim 9, wherein the molding box is made of material having low thermal conductivity and high resistibility against pressure.

20. A device for producing a block of solidified carbon dioxide comprising, in combination:
    a high pressure vessel containing liquified carbon dioxide,
    a flexible, thermally insulated high pressure feed tube,
    a common distributor, and
    a molding box comprising a plurality of molding chambers in which a predetermined number of solidifed carbon dioxide blocks are molded,
    one end of said high pressure feed tube being connected to said high pressure vessel via value means comprising a stop valve and pressure reducing valve while the other end thereof being connected to said molding box via said distributor,
lever operated pressure reducing valves and nozzle means,
said molding box having a cubic structure of rectangular configuration and including a top cover having the plural nozzle means secured thereto, plural pairs of first side walls oppositely located in a face-to-face relation, a pair of second side walls oppositely located in a face-to-face relation and a base board, each of said members being formed to define a square or rectangle and adapted to be connected to or disconnected from any one of the adjacent members,
said first and/or second side walls provided with a plurality of openings through which gaseous carbon dioxide flows out and with a layer of filter material of predetermined mesh size, the fileter material being fixedly secured to the inner wall thereof.

* * * * *